United States Patent Office 3,080,754
Patented Mar. 12, 1963

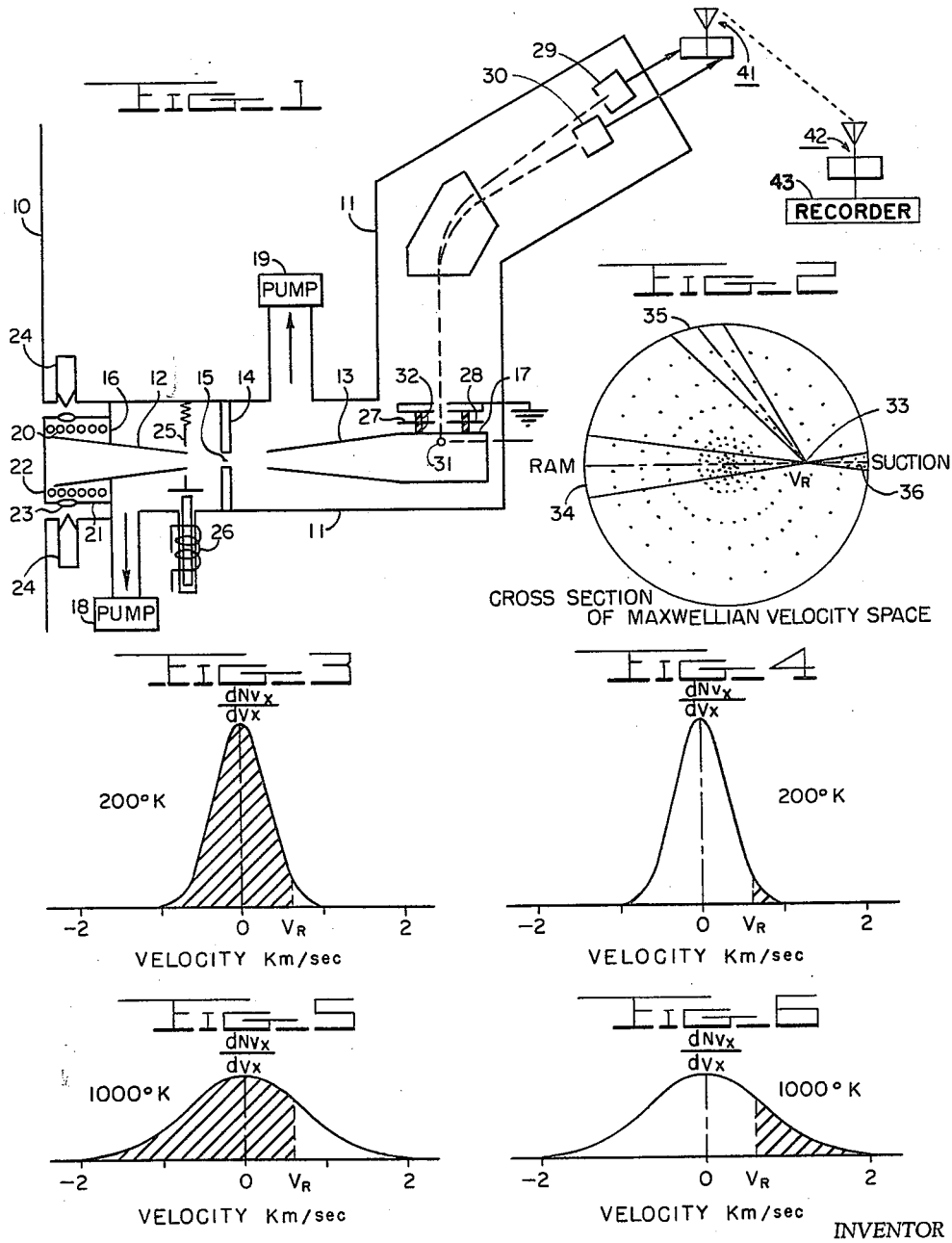

3,080,754
DIRECT METHOD OF MEASURING NEUTRAL
GAS TEMPERATURES
Charles Y. Johnson, Annandale, Va., assignor to the United States of America as represented by the Secretary of the Navy
Filed July 10, 1961, Ser. No. 123,070
13 Claims. (Cl. 73—339)
(Granted under Title 35, U.S. Code (1952), sec. 266)

The invention described herein may be manufactured and used by or for the Government of the United States of America for governmental purposes without the payment of any royalties thereon or therefor.

The present invention relates to a device and method of directly determining the neutral gas temperature of a rarefied atmosphere relative to a vehicle carrying the device by measuring the velocity distribution of a particular constituent of the gas.

Heretofore temperature has been a derived quantity obtained from measurements made of the gas density present in a rarefied atmosphere and its change with altitude. Such measurements are obtained by the use of Philips ionization gauge mounted on the side of a rolling rocket in a rarefied atmosphere. Ground based measurements of visible radiation from atmospheric contamination experiments such as sodium vapor clouds ejected into the atmosphere near sunrise or sunset also has been used. Temperature in this instance is derived from an interpretation of the resonance lines emitted by the sodium cloud. Another group of temperature measurements make use of ions or electrons present in the upper atmosphere. These measurements make the assumption that the ion or electron temperature is identical to the neutral gas temperature. These methods depend on various assumptions which prevent a true direct measurement of temperature.

The present invention is directed to a device and method of directly determining the neutral gas temperature of a rarefied atmosphere relative to the vehicle carrying the device by measuring the velocity distribution of a particular constituent of the gas. In the case of the earth's upper atmosphere the vehicle may be a sonding rocket or satellite and the temperature so determined by the device will be that of the neutral gas present, relative to the earth. For studies in interplanetary space where the vehicle is a space probe traveling along an arbitrary orbit the neutral gas temperature determined by the device is relative to the vehicle. Knowledge of the vehicle's orientation and velocity relative to the sun, earth or other planetary body permits transformation of the temperature relative to the sun or other planetary body.

This invention overcomes the objections of the prior art by making a fundamental measurement of the temperature of a rarefied atmosphere according to the following principles. Thermodynamically temperature is defined by the equation:

$$\frac{1}{2}m\bar{v}^2 = \frac{3}{2}KT$$

where $m$ is the atomic mass of the constituent gas under study $\bar{v}^2$ is the root-mean-squared speed of the gas, K is Boltzmann's constant and T is the temperature. Thus one sees that only two quantities need be measured, $m$ and $\bar{v}$ to make a fundamental determination of the temperature of a rarefied gas sufficiently dense so that a Maxwellian velocity distribution exists. Because of the equipartition of energy among the several constituents of a mixed atmosphere the temperature of one constituent is the temperature of all others. Mass $m$ is measured by a vehicle borne mass spectrometer. The velocity $\bar{v}$ is determined by the variation, as a function of roll position, of the number of particles of mass $m$ traversing a suitable collimating system mounted on the vehicle traveling through the rarefied gas to be measured.

It is therefore an object of the present invention to determine the temperature of a rarefied gas by directly measuring the velocity distribution of a particular constituent.

Another object is to use a simple relatively inexpensive structure in conjunction with the natural characteristics, roll and vehicle velocity, of the vehicle on which it is mounted to determine the temperature of a rarefied gas through which the vehicle travels.

Still another object is to provide means for reducing background contamination within an instrument which measure one or more of the parameters of a rarefied atmosphere.

Yet another object is to provide a system which avoids residual gas contaminants in the instrument without the presence of a gravitational field.

The exact nature of this invention as well as other objects and advantages thereof, will be readily apparent from considerations of the following specification relating to the annexed drawings, in which:

FIG. 1 illustrates a schematic drawing of the relative parts of the device for carrying out the invention;

FIG. 2 illustrates a two dimension cross-section of a Maxwellian velocity space distribution of a gas at temperature T relative to the earth, in which a rocket having velocity $V_R$ is moving;

FIGS. 3 and 4 illustrate a Maxwellian distribution function of number density per velocity interval of a single component for a temperature of about 200° K. in which the shaded area represents the number of particles accepted by the instrument during "ram" (FIG. 3) and "suction" (FIG. 4) of the instrument on a rolling vehicle having velocity $V_R$ in flight; and FIGS. 5 and 6 respectively illustrate the same as FIGS. 3 and 4 except for a temperature of about 1000° K.

The present invention is directed to a method and means for directly measuring the temperature of a rarefied gas where the mean free path of the entering particles is comparable to the dimensions of the entrance system by means of equipment mounted within a vehicle and fired into the rarefied gas. The invention comprises a pair of slits or collimating tubes mounted at an angle to the roll axis of the vehicle through which gas molecules are directed into a mass spectrometer of the Nier type described in Patent No. 2,551,544 or any other suitable mass spectrometer. The mass spectrometer produces ions of specific gases having passed through the slit or collimeter which are analyzed and directed onto suitable detectors. The ion current reaching the detectors is amplified and telemetered to a ground recorder. In carrying out the teaching of the present invention, two gases such as nitrogen and argon are detected because of their abundance and chemical neutrality in order to have a record of two different gases for comparison. The temperature is determined from the knowledge of the vehicle velocity $V_R$, the attitude of the vehicle relative to the flight trajectory, the mass of the molecule, nitrogen or argon, and the variation of the number of molecules passing into the mass spectrometer during the roll period or any portion thereof. The system including the entrance slit and the mass spectrometer are evacuated both before and during flight. As the vehicle passes through a rarefied gas a cone of finite width through the velocity space system of the Maxwellian distribution of a gas at temperature T is swept out. The fact that the cone is located at the end of a vector of velocity $V_R$ permits one to observe a variation in the number of gas molecules which enter the system from a specific direction and thus to determine the velocity distribution of a single constituent and hence temperature directly.

Now referring to the drawings, there is shown in FIG. 1, a schematic drawing of a suitable device for carrying out the present invention. The device is secured in a vehicle 10 and includes a vacuum tight housing 11 which contains an entrance cone 12 separated from a source cone 13 by a plate 14 which has an opening 15 therein concentric with the axes of the entrance and source cones. Concentric slits or other types of orifices are applicable. However, cones are preferred because of their molecular pumping characteristics. Cone 12 opens toward the atmosphere and is held in position by a partition 16 whereas cone 13 opens toward a mass spectrometer 17 secured within the housing 11. Cone 13 is an integral part of the ion source of the mass spectrometer 17. The partition 16 separates the inner portion of the vacuum housing from the atmosphere and permits the evacuation of the housing between partitions 14 and 16 through pump 18, whereas pump 19 evacuates the housing containing the remainder of the instrument. A suitable pump is one which operates in a gravitational free condition such as Getter-ion titanium plate units or similar systems in which "getting" to active surfaces occurs either chemically or by ionic bombardment; conventional mechanical pumps or gas diffusion pumps will not operate in a gravitational free condition. In order to evacuate the system on the ground and during the first portion of the flight, the entrance cone is provided with a cover 21 which has a spring loaded cap 22 secured in place by a glass ring 23. The glass ring is adapted to be broken during flight by squib-activated hammers 24 which are activated at a specified height. Spring 20 ejects cap 22 when glass 23 is broken. Shutter 25 when actuated electromagnet 26 interrupts the molecular beam entering through cone 12 and permits a gas background calibration reading to be obtained. Deflection plates 27 and 28, constitute part of the ion source analyzer and are electronically controlled for calibration purposes, as will be discussed later. Source cone 13 opens into the mass spectrometer 17 and directs gas molecules into the ion source 31. Conventional mass spectrometer analysis of the ions formed follows as per Nier Patent No. 2,551,544 wherein the desired ions are detected by detectors 29 and 30.

FIG. 2 illustrates for simplicity a two dimensional view of a cross-section of Maxwellian velocity space which illustrates the normal relationship of the number density velocity relationship of gas molecules concentrated in the center with the velocity concentration growing less in all directions with increasing velocity. Assume that one stands at the displaced point 33 off the center of velocity space, then rotating through 360°, various densities of gas molecules will be viewed. If the gas molecules are cold, the molecules will be more dense at the center and not so many in the outer area, so one will see a very dense area as he rotates through the center and less and less during rotation off the center. If the gas temperature is increased the molecules are more active in striking each other, therefore the density near the center will be decreased with an outward radial increase from the center.

In carrying out the teaching of the present invention, and for illustrative purposes the detecting system is mounted on a vehicle fired into a rarefied atmosphere under conditions such that the vehicle's velocity and roll attitude are known during its flight. At a specified altitude the squib-activated hammers break the glass ring holding the cover over the entrance cone and the spring forces the cover away from the rocket surface. Assuming the detector to be located at 33, FIG. 2, and rotated by the roll of the vehicle, then the entrance cone will sweep a volume of finite size through the velocity space system of the Maxwellian distribution of the gas at temperature T. Because of the roll of the vehicle about its axis, and the fact that the vehicle's velocity displaces the detector to position 33 in velocity space, the number of particles reaching the ion source will be those which are permitted by the entrance cone, the partition 14 and the source cone 13, i.e., those particles which have directions subtended by the detector system. Particles entering the entrance cone from outside the preferred direction strike the walls of the entrance cone and are discriminated against, by either bouncing back out into the space from which they came or by hitting the partition 14 and are eventually pumped away by vacuum pump 18. The few particles which pass through opening 15 at an angle such that they do not enter source cone 13 are captured by vacuum pump 19. Thus the detector is highly discriminatory in favor of all particles whose velocity vector is directed within the solid angle subtended by the cones of the detector system. Pump 19 also functions to maintain a high vacuum within the housing 11 between partition 14 and the spectrometer detectors or collectors 29 and 30. By so doing, the background due to residual gas in this volume is kept low and the signal to noise ratio enhanced (the signal being the ions produced from the preferred particles entering the source cone). Thus the system shown is analogous to a one-way street where the particles entering from the preferred direction with the proper velocity are accepted for detection, all the others are discriminated against. Those particles not ionized in the ion source leak out into the housing 11 and are pumped away by pumps 18 and 19.

Source cone 13 also serves to "thermalize" the accepted particles; that is, bring all the particles, whether they enter at a high or low velocity, from the ambient rarefied atmosphere, to an equilibrium temperature for detection by the mass spectrometer. In order to reduce the pumping speed of the spectrometer ion source and at the same time enhance the density of the thermalized neutral particles within the ion source for detection, the slits of the ion source are baffled with insulators 32.

When the entrance system looks forward along the rocket trajectory, an increase in number of molecules will be detected due to "ram" such as illustrated by the "pie slice" at 34 through the center of FIG. 2. As the vehicle rolls, the entrance system will be rotating away from "ram" and a fewer number of molecules will be detected as illustrated at 35. Then as the entrance system looks backwards gas molecules will be under "suction" and very few will be detected as illustrated at 36. The only gas molecules not entering the system under "ram" at 34 will be those molecules that have greater velocities than the rocket and are moving away from the entrance system. Then on the "suction" side those molecules having a greater velocity than the rocket will enter the entrance system and be detected, provided the molecules enter the entrance cone at the proper angle to pass through the cone system.

In operation of the system, the system is evacuated and a vacuum is maintained in the device prior to mounting in the vehicle as well as during flight. The vehicle is launched and after reaching a specified height the squib is actuated to operate the hammers to break the glass ring holding the cover 22 in place. The spring forces the cover away from the surface of the rocket, then the detector system is open to receive the gas molecules. Typical cones are made as 8° half angle cones separated by a plate which limits the direction from which the molecules can enter and be detected. Only those molecules entering from the angle subtended by the cone walls pass into the mass spectrometer unimpeded wherein the great majority of those molecules from without this acceptance cone are either rejected by the entrance cone or removed from the stream by the pumps. The molecules passing through the entrance cone at the improper angle to pass through the concentric opening 15 is stopped by the plate 14 and pumped out of the system by pump 18. Any molecules passing through the opening 15 and not entering the source cone 13 and those ions not detected by the ion detectors are pumped off by vacuum pump 19. Those molecules passing through the cones are directed into the ionization chamber of the mass spectrometer 17 where the molecules are ionized by electron bombardment. The ions are subsequently analyzed by the mass spectrometer and detected by the detectors 29 and 30. The particular system described is made such that argon ions are detected by the detector 29 and molecular nitrogen is detected by the detector 30. The signals from each of the detectors are directed to suitable amplifiers and telemetering equipment 41 where the signals are amplified and then telemetered to suitable receiver and signal amplifying equipment 42 on the ground where the received signal is amplified and recorded by recorder 43.

FIGS. 3 and 4 respectively, illustrate in the cross-hatched section that portion of a recorded curve for nitrogen molecules at a temperature of about 200° K. which is recorded during "ram" 34 and "suction" 36 when the vehicle has a directed velocity $V_R$.

The difference in the curves as illustrated by FIGS. 3, 4 and FIGS. 5, 6 illustrates the variation in the concentration of the molecules for "ram" and "suction" for different temperatures. The higher the temperature the more uniformly the molecules are spread out over a given area in FIG. 2. FIG. 3 illustrates a large concentration of gas molecules over a short velocity interval whereas FIG. 5 illustrates a spreading out of the concentration of molecules. The cross hatched areas shown in FIGS. 3–6 represent the number of nitrogen molecules entering the source cone under "ram" and "suction" conditions for temperatures of about 200° K. and 1000° K. The output signals from the detectors are transmitted to a receiver on the ground.

From the velocity and attitude of the rocket, and the relative number of molecules of the specific atmospheric constituent detected by the mass spectrometer the neutral gas temperature is determined. The velocity is determined by radar tracking of the rocket. Attitude is known from optical and magnetic aspect devices carried in the rocket and the velocity distribution of the atmospheric molecules is determined as a function of the roll position by the signal from the mass spectrometer. Since the mass spectrometer separates molecular nitrogen and argon from other atmospheric constituents two independent temperature measurements are made simultaneously.

To assist in analyzing the resultant data, two inflight calibration systems are provided. The first utilizes an electrical signal on deflection plates 27 and 28 which defocus the ion beam and permits the detectors to return to zero condition. The second calibration is done by shutter 25 and electromagnet 26 which when energized closes the apex of cone 12 thus interrupting the entering molecular beam. When this occurs a reading of the background gas present in the housing 11 is obtained. This information is necessary in order to subtract out the background residual gas from the signal present when the shutter is open.

In addition to the temperature measurement the ratio of the molecular nitrogen to argon detected versus altitude can yield a gravitational diffusive separation measurement of these two gases.

Obviously many modifications and variations of the present invention are possible in the light of the above teachings. It is therefore to be understood that within the scope of the appended claims the invention may be practiced otherwise than as specifically described.

What is claimed is:

1. In a system for determining the neutral gas temperature of a rarefied atmosphere which comprises, a vacuum tight housing, an entrance cone and a source cone, a partition in said housing separating said entrance and source cones, an aperture in said partition in axial alignment with said entrance and source cones, means for evacuating said housing on each side of said partition, a mass spectrometer mounted in said housing and connected with said source cone for producing ions of gases directed into said mass spectrometer through said source cone, said mass spectrometer including at least one detector positioned relative to said spectrometer to detect said ions, said detector adapted to produce an output signal proportional to the number of said detected ions, and means adapted to record said output signal produced by said detector.

2. In a system as claimed in claim 1 wherein said entrance cone is provided with a cover means and means for ejecting said cover means.

3. In a system for determining the neutral gas temperature of a rarefied atmosphere which comprises, a vacuum tight housing, an entrance cone and a source cone, a partition in said housing separating said entrance cone from said source cone, an aperture in said partition in axial alignment with said entrance and source cones, means for continuously evacuating said housing on each side of said partition, a mass spectrometer mounted in said housing and joined with said source cone with said source cone entrance directed toward said entrance cone, said mass spectrometer producing ions of desired gases directed into said mass spectrometer through said source cone, said entrance cone, partition and said source cone discriminating against particles which are pumped off by said means for evacuating said housing, said mass spectrometer including at least one detector positioned relative to said mass spectrometer to detect ions produced by said mass spectrometer, said detector adapted to produce an output signal proportional to the number of said detected ions, and means adapted to record said output signal produced by said detector means.

4. In a system for determining the neutral gas temperature of a rarefied atmosphere which comprises, a vacuum tight housing, an entrance cone and a source cone in axial alignment with their vertex end facing each other, a partition in said housing separating said entrance cone from said source cone and located at the vertex thereof, an aperture in said partition in axial alignment with said entrance and source cones, a first vacuum pump for evacuating said housing in the housing section containing said entrance cone, a second vacuum pump for evacuating said housing in the section containing said source cone, a mass spectrometer mounted in said housing section containing said source cone and connected with said source cone, said mass spectrometer producing ions of gases directed into said mass spectrometer through said source cone, said entrance cone, partition and said source cone discriminating against particles which are pumped off by said first and second vacuum pumps, said mass spectrometer including at least one detector positioned relative to said mass spectrometer to detect ions of a specific mass produced by said mass spectrometer, said detector means adapted to produce an output signal proportional to the number of detected ions, and means adapted to record said output signal produced by said detector.

5. In a system as claimed in claim 4 wherein said vacuum pumps are of the type which operates in a gravitational free condition.

6. In a system as claimed in claim 4 which includes in combination with said entrance cone a means for permitting a gas background calibration reading in said evacuated housing.

7. In a system as claimed in claim 4 which includes in combination with said mass spectrometer means to determine the reference level of said detectors.

8. A structure for directing a desired gas into a mass spectrometer which comprises a source cone, an entrance cone, and a partition separating said source cone from said entrance cone, said partition having an opening therein in axial alignment with said source and entrance cones, said source cone being integral with a mass constituent detecting means of said mass spectrometer.

9. A structure as claimed in claim 8 which comprises vacuum pump means for evacuating undesired gas excluded by said entrance cone, partition and source cone.

10. A structure as claimed in claim 9 wherein said entrance cone has a cover over one end thereof.

11. A method of determining the neutral gas temperature of a rarefied atmosphere which comprises firing an instrument carrying vehicle into a flight path into said rarefied atmosphere, determining the velocity and the attitude of said vehicle relative to said flight path of said vehicle, determining the mass of specific gas molecules and the variation of the number of molecules as a function of vehicle velocity and attitude by use of said instruments on said vehicle, and recording the number variation of molecules which is a function of the temperature of said rarefied atmosphere.

12. A method of determining the neutral gas temperature of a rarefied atmosphere which comprises firing an instrument bearing vehicle into said rarefied atmosphere, determining the vehicle's velocity and roll attitude during flight, discriminating against certain gas molecules incident upon the system from an undesired direction from entering a mass spectrometer on said vehicle, detecting ions produced by desired gas molecules in said mass spectrometer, telemetering a signal derived from said detected ions to a ground recorder and recording said signal from which the temperature is derived.

13. A method as claimed in claim 12 which comprises evacuating said particles discriminated against.

References Cited in the file of this patent

UNITED STATES PATENTS 2,387,786    Washburn    Oct. 30, 1945
2,652,497    Miller    Sept. 15, 1953

OTHER REFERENCES

Review of Scientific Instruments I, vol. 23, No. 10, October 1952, pp. 538–541 relied upon. 250–41.9G.

Review Scientific Instruments II, vol. 29, No. 11, November 1958, pp. 935–942 relied upon. 250–41.9G.

Journal of Applied Physics, vol. 16, November 1945, pp. 646–654 relied upon. 250–41.9S.